G. HIPWOOD & P. EGAN.
VEHICLE FENDER.
APPLICATION FILED NOV. 11, 1910.
1,085,423.
Patented Jan. 27, 1914.
3 SHEETS—SHEET 3.
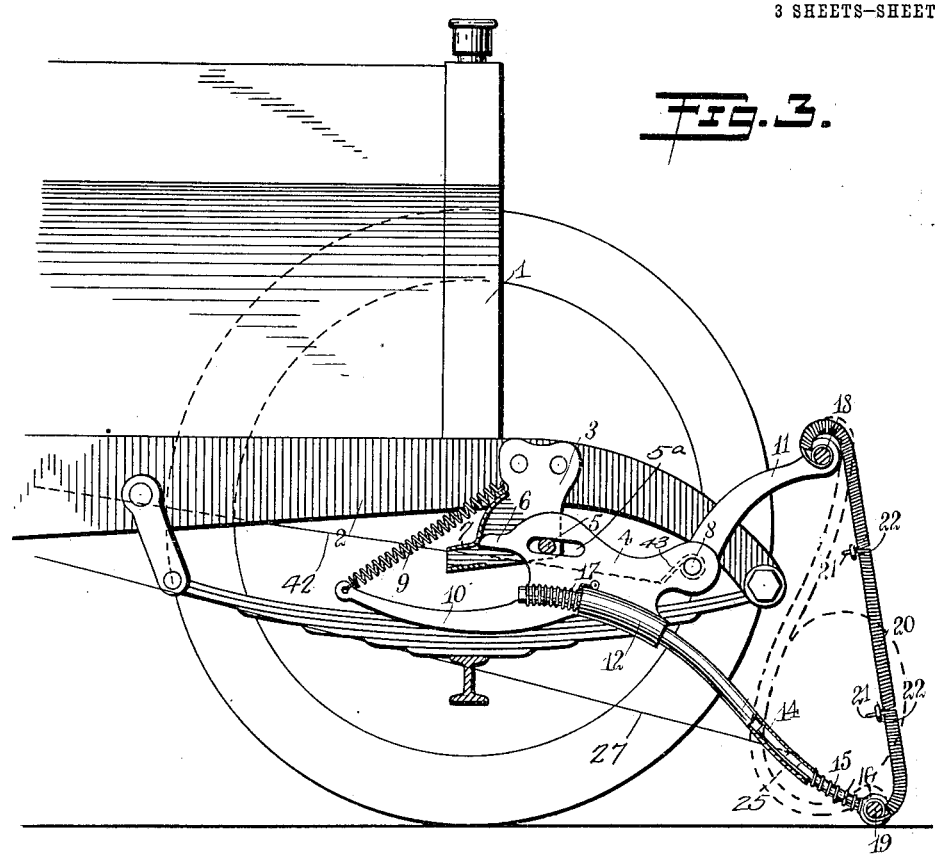
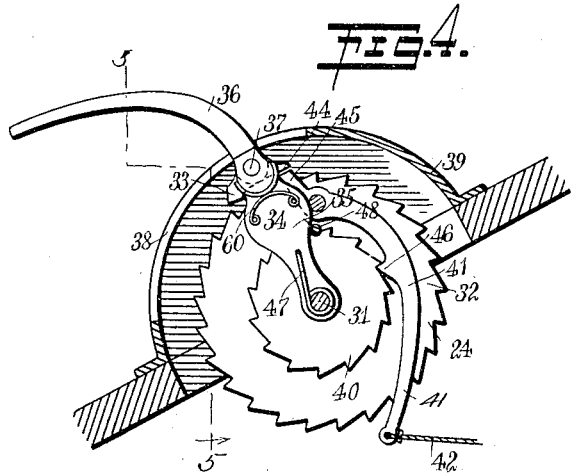
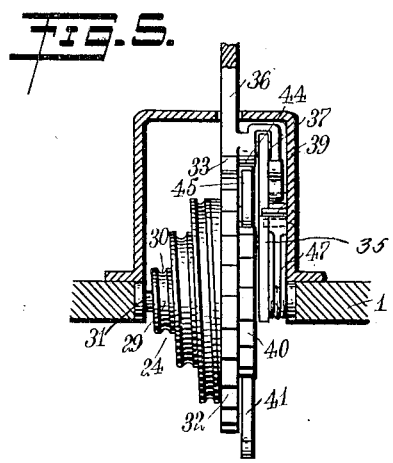
WITNESSES
G. Robert Thomas
R. Whiting
INVENTORS
George Hipwood
Patrick Egan
BY
ATTORNEYS

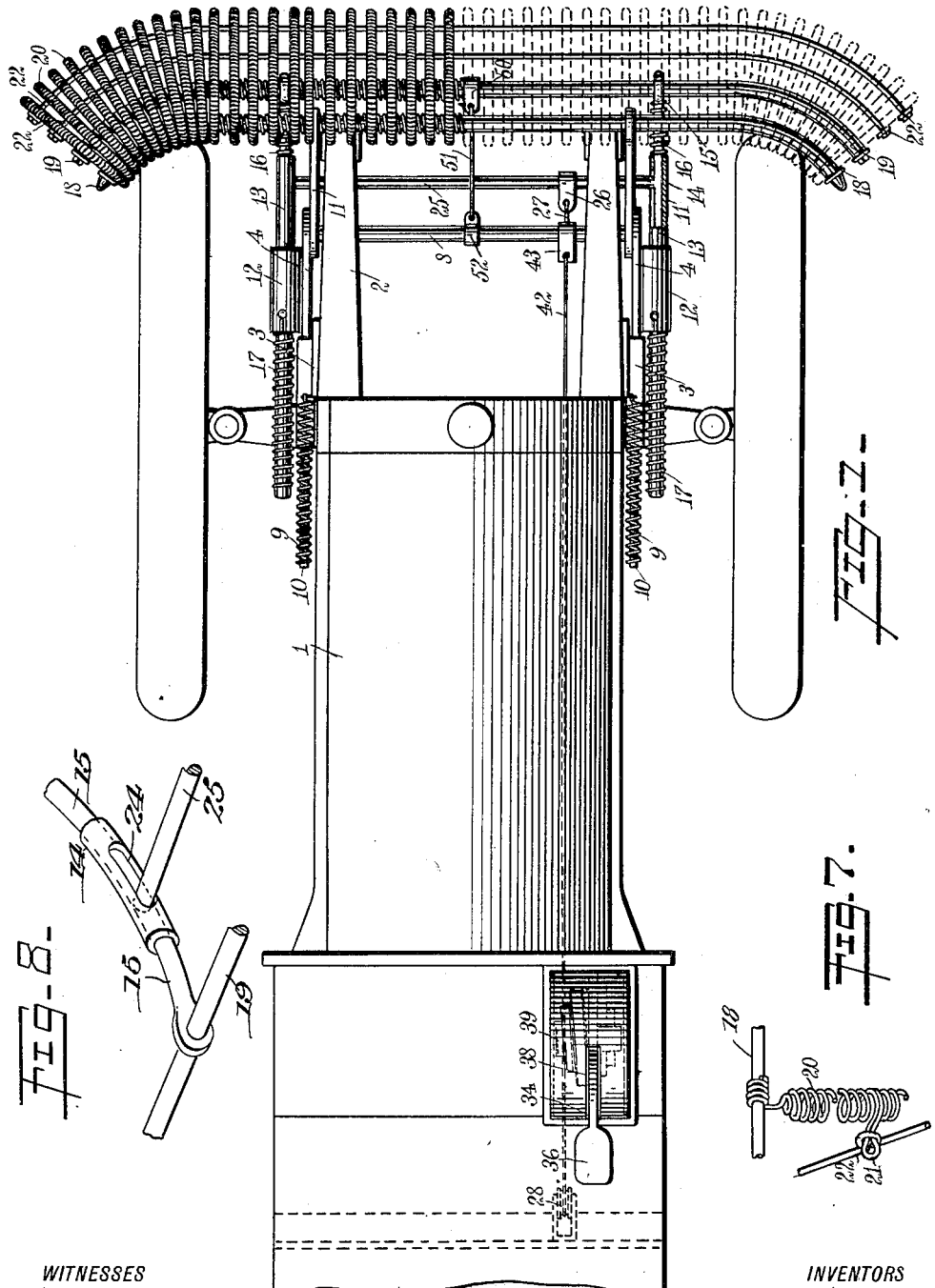

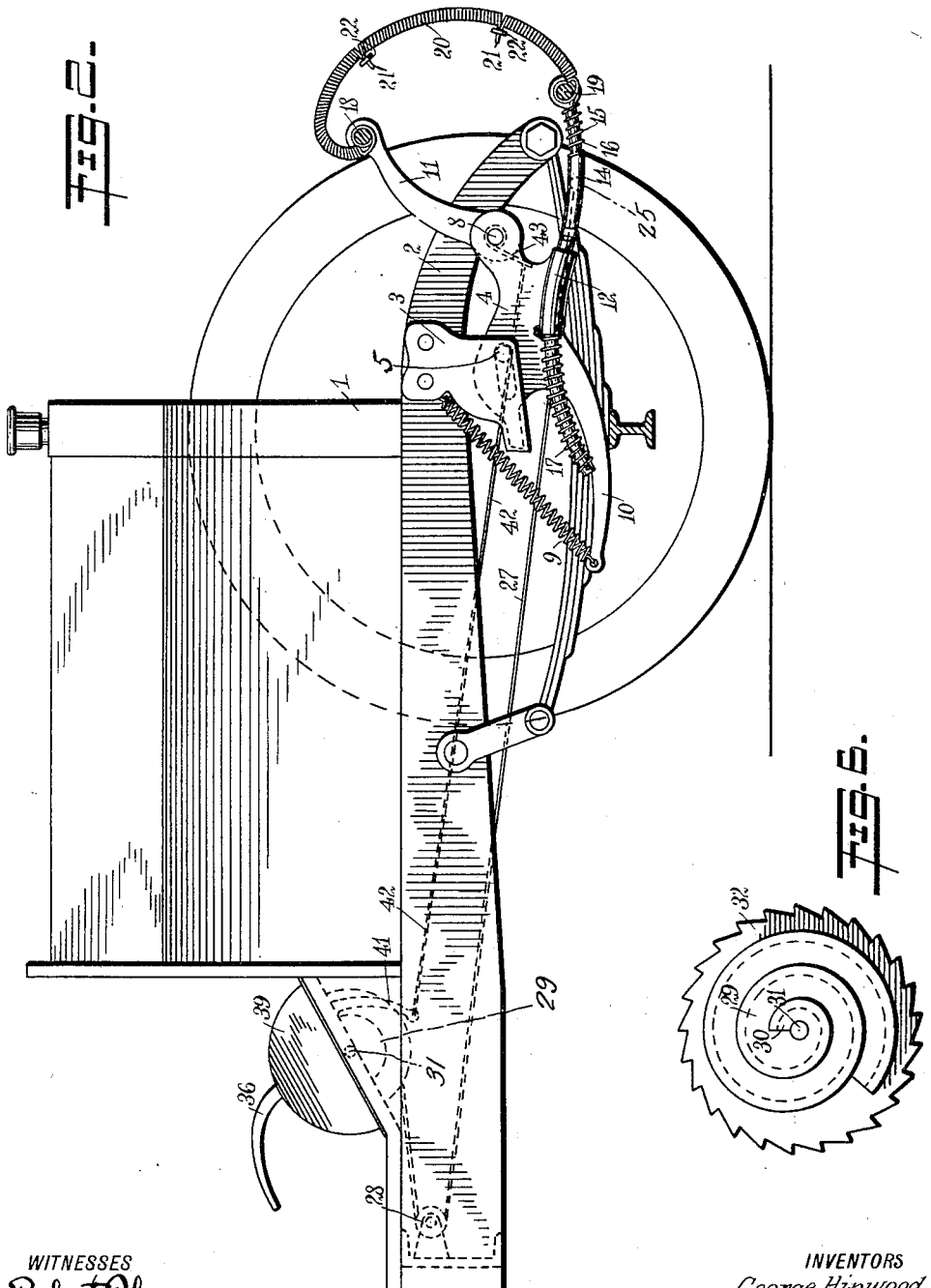

UNITED STATES PATENT OFFICE.

GEORGE HIPWOOD AND PATRICK EGAN, OF NEW YORK, N. Y.

VEHICLE-FENDER.

1,085,423.

Specification of Letters Patent.

Patented Jan. 27, 1914.

Application filed November 11, 1910. Serial No. 591,831.

*To all whom it may concern:*

Be it known that we, GEORGE HIPWOOD and PATRICK EGAN, both citizens of the United States, and residents of the city of New York, borough of Manhattan, in the county and State of New York, have invented a new and Improved Vehicle-Fender, of which the following is a full, clear, and exact description.

Among the principal objects which the present invention has in view are: to provide an apparatus of the character mentioned adapted to operate in dual capacity, as a buffer and as a fender; to provide means for causing the apparatus to automatically assume a position to operate in the latter of the above named capacities; and to provide means manually operative for disposing the mechanism in position to operate in either of the above mentioned capacities, and if desired without necessitating the chauffeur or driver leaving the vehicle.

One embodiment of the present invention is disclosed in the structure illustrated in the accompanying drawings forming part of this specification, in which like characters of reference indicate corresponding parts in all the views, and in which—

Figure 1 is a top plan view of the forward section of an automobile having applied thereto a fender constructed and arranged in accordance with the present invention, the apparatus being disposed in position as a buffer; Fig. 2 is a side elevation of the same; Fig. 3 is a view similar to Fig. 2 showing a further diminished fragment of the automobile and the fender in its lowered operative position; Fig. 4 is a detail view, on an enlarged scale, showing the side view of a mechanism for operating the fender to dispose the same in either of the alternative operative positions; Fig. 5 is a vertical section taken on the line 5—5 in Fig. 4, showing the winding drum and operating controlling ratchets therefor; Fig. 6 is a side view of the winding drum and ratchet for operating the fender; and Fig. 7 is a detail view in perspective showing a fragment of one of the springs of which the fender is composed and one of the spacing bars employed in conjunction therewith. Fig. 8 is a detail view on an enlarged scale, showing in perspective, fragments of the yielding frame and support therefor.

The present invention relates to improvements in devices of the character disclosed in Patent No. 967,380 granted to George Hipwood under date of August 16, 1910, to which cross reference is here made.

As seen in the accompanying drawings the fender is applied to an automobile structure, the bonnet 1 of which is mounted upon the side bars 2, both of usual construction. The present fender is supported on the side bars 2 by means of brackets 3, said brackets being bolted to the side bars, as seen best in Fig. 2 of the drawings. The brackets 3 are duplicated, one being disposed at each side of the automobile, and each bracket having on the inner side thereof a rearwardly disposed curved flange 7 to form a path for the end of the extensions 6 provided on each of the side plates 4.

The plates 4 constitute the body elements of the fender, and are structurally connected by a cross bar 8, which unites in couple both of the plates 4. The plates 4 are each supported in the brackets 3 by the pins 5, the said pins being extended through elongated slots 5ª formed in said plates.

The plates 4 are moved by pull springs 9 to the position shown in Fig. 3 of the drawings, where the pins 5 are near the rearward end of the slots 5ª. In this position also, it will be noted, the extensions 6 bear against the portion of the flange 7 which is concentric with the pins 5, thereby forming a lock for the fender when in the operative position shown in Fig. 3 of the drawings.

The springs 9 are each anchored to the brackets 3, and are each connected to an eyelet formed in the rearmost end of an arm 10. The plates 4 are swung on the pins 5 to the position shown in Fig. 2, by a cable 27. The cable 27 is anchored at the forward end to a tubular cross bar 25. The cross bar 25 is rigidly connected with the short bars 15, and is extended through slots 24 in the tubular side arms 14. The movement of the bars 15 and 25 is limited by the slots 24. The side arms 14 are structurally united by the cross bar 25, and are slidably mounted in the tubular guides 12, with one of which each of the plates 4 is provided.

When the cable 27 is drawn up to retract the arms 14, the plates 4 are moved backward over the pins 5 in the brackets 13, the slots 5ª permitting this movement. The extensions 6, sliding upon the flange 7 are depressed thereby, which action raises the forward ends of the plate 4 and the arms 11 connected therewith. The retraction of the plates 4 and the arms 10 connected therewith, results in extending under tension the springs 9. The retraction of the arms 14 also extend under tension the springs 17. In this position the device is held by the cable 27 which is wound upon the drum 29 and held by the pawl 33, ready for operation when the said pawl is released.

The side arms 14 are formed of tubes, to provide guides for holding the short bars 15. The short bars 15 are structurally connected by a cross foot bar 19. The bar 15 is normally extended from the side arms 14 by spiral springs 16. The purpose of the construction employing the springs 16 and the bars 15 and 19 is to provide a structure adapted to yield to the impact when striking a stationary body. The limit of the extension of the bars 15 is provided for in any suitable manner.

The side arms 14 are maintained in the extended position shown in Fig. 3 of the drawings by the pull springs 17, which are anchored to each of the plates 4 and to the end of each of the arms 14. When, as shown in Fig. 2, the cable 27 is manipulated to retract the cross bar 25 and arms 14 connected therewith, and to move the plates 4 as shown in said figure, the springs 17 are distended under tension, ready, when permitted, to throw the arms 14 to the extended position. When the springs 17 are extended as shown in Fig. 2, the springs 9 are also extended, and the release of the cable 27 permits both springs to simultaneously perform their function to rock the plates 4 to the position shown in Fig. 3, and to extend the side arms 14, as shown in the same figure.

The release of the cable 27 is effected by the rocking of the arms 11. The arms 11 are pivotally mounted upon the cross bar 8, and are structurally united by a cross head bar 18. The cross bars 18 and 19 are shaped to form at the ends bowed sections to extend laterally beyond the path of the wheels of the vehicle.

Mounted upon each of the arms, and wrapped thereover are spiral springs 20. The springs 20 are juxtaposed sufficiently close to form buffers or cushions for the bars 18 and 19, to prevent damage to a body striking the same. The springs 20 are each provided with a loop 21 laterally extended and preferably projected from the rear side of each spring to receive light spacing bars 22. The spacing bars 22 are shaped to conform with the bars 18 and 19.

Due to the flared relation of the arms 11 and 14, the extension of the arms 14, as seen in Fig. 3, operates to stretch the springs 20 to form a yielding structure adapted to assume the position shown in dotted lines in said figure, to constitute a hammock or receptacle for a body deposited thereon. When, due to the operation of the cable 27, the arms 14 are retracted, the bars 18 and 19 being drawn in closer proximity, the springs 20 are forced to assume the forwardly bulged position shown in Fig. 2.

The cable 27 is passed over a pulley 28, and is then wound upon a drum 29 having formed thereon a spiral groove 30. The drum 29 is mounted on trunnions 31 in bearings suitably disposed in the structure of the automobile or vehicle. Upon the drum 29, rigidly secured thereto, is mounted a ratchet wheel 32. The ratchet wheel 32 is adapted to be engaged by a pawl 33, which is integrally formed with a lever 36. The lever 36 is pivotally connected at 37 with a rocking arm 35. The arm 35 is pivotally mounted on one of the trunnions 31, as seen best in Fig. 4 of the drawings. The lever 36 is guided by the slot 38 which is formed in a casing 39, said casing being rigidly mounted on the body structure of the vehicle, as best shown in Fig. 1 of drawings.

The lever 36 is designed for manipulation by the foot of the driver. The first portion of the operation, when the driver places his foot at the end of the lever 36, rocks said lever on the pivotal bearing at 37 to engage the pawl 33 with the ratchet wheel 32. This engagement being established, the remainder of the pressure of the foot on the lever 36 rotates the ratchet wheel 32 and the drum 29 connected therewith. The limit of the rotation of the drum 29 is the limit of the slot 38. If a succession of engagements of the lever 36 with the ratchet wheel be required, this is effected by the operator first releasing the lever 36 and then rigidly reëngaging and bracing the same. The wheel 32 and parts connected therewith are prevented from reversion in revolution by the ratchet wheel 40 rigidly connected with or integrally formed with the wheel 32. The teeth of the ratchet wheel 40 are pitched in the same direction as the teeth in the wheel 32, and are engaged successively by the spur 46 of a lever 41. The lever 41 is pivoted at 34, and is operatively connected with a cable 42. The cable 42 is operatively connected to a short arm 43 rigidly mounted upon and extended from the bar 8 on which are mounted the arms 11. The short end 45 of the lever 41 is disposed, as shown best in Fig. 4 of the drawings, beneath a heel piece 44 mounted on the lever 36 at the back of the pawl 33, operating the lever 41 from either end surface to release the engagement of the spur 46 with the teeth of the ratchet wheel 40, which releases the hold on the drum 29, and permits the springs 9 and 17 to rock the plates 4 and project the side arms 14 to the position shown in Fig. 3.

With a fender constructed and arranged as described, and shown in the accompanying drawings, the operation is as follows: The usual service position is that illustrated in Figs. 1 and 2. The side arms 14 being retracted, and the springs 20 being outwardly bowed, the device is now capable of being set manually in the position shown in Fig. 3, or automatically assuming that position. When manually set, the operator, placing his foot below the lever 36, lifts the free end thereof, and depresses the heel piece 44 on the short end 45 of the lever 41, thereby lifting the spur 46 from engagement with the wheel 40. The drum 29 being thus released, the springs 9 and 17 operate in the manner indicated, and the fender assumes the position shown in full lines in Fig. 3. When, now, the object is struck, the springs 20 yield and form a pocket-like receptacle in which the body of the person or object is carried until the speed of the vehicle is arrested. This is the operation for which the fender is principally designed, the assumption being that the chauffeur or driver will usually have time to set the fender in the desired operative position before striking the obstacle. If, however, collision with the object be otherwise unprovided for, the object strikes the bar 18, and rocks the arms 11 and the bar 8 connected therewith. The rocking of the bar 8 moves the short arm 43 to pull on the cable 42, and by said cable moves the lever 41 to release the spur 46 thereof from engagement with the ratchet wheel 40. This engagement of the wheel 40 and the drum 29 mounted thereon permits the operation of the springs 9 and 17 to set the bars 18 and 19 in the position shown in Fig. 3. Thus, if a person is struck by the fender the foot bar 19 would be advanced, to act as a scoop, lifting the body upward against the yielding wall formed by the springs 20, said springs yielding backward to form a pocket substantially as shown by the dotted lines in Fig. 3 of the drawings.

After the fender has been set to the position shown in Fig. 3, it may be moved to the position shown in Fig. 2, by operating the lever 36, placing the foot of the chauffeur thereover, to depress the free end of the same. In depressing the lever 36, the initial movement of said lever winds the cable 27 on the small end of the spiral groove 30. The leverage thus effected overcomes the initial pull of the springs 17 and 9. When the operator releases the lever 36, a spring 47 returns the arm 35 and the lever 36 connected therewith to the engaging position for said lever. In the meantime, the wheel 40 has been engaged by the spur 46, which holds the drum 29 from reversing. The further depression of the lever 36 effects further winding of the cable 27 upon the drum 29. This operation is continued, as many manipulations of the lever 36 being employed as is found necessary to rock the plates 4 and retract the arms 14 and the cross bar 25 connected therewith.

When the automobile or vehicle provided with a fender of the character described is run into the garage, or is being operated in a crowded thoroughfare where there is danger of accidental operation, this is provided against by using the auxiliary link bar 51 shown in Fig. 1 of drawings. This is pivotally mounted to a clip 52, and is provided with a hook end to engage an eyeleted clip 50 in the bar 19. When the machine is in the usual service, the hook end of the bar 51 is lifted from the eyelet clip 50, and the operations above described ensue. It will be understood that when the bar 51 is employed, the fender parts may not be released in the manner as above described.

Having thus described our invention, we claim as new and desire to secure by Letters Patent:—

1. The combination with the frame of a vehicle, of a buffer movably mounted on said vehicle, means for transforming said buffer into a scooper, means for lowering said buffer bodily, and means for preventing the transformation of said buffer into a scooper.

2. The combination with the frame of a vehicle, of a buffer movably mounted on the frame of the vehicle, so as to occupy either a raised or lowered position, means for lowering said buffer, means for transforming said buffer into a scooper, and locking mechanism for holding said buffer in its buffer form, either in its raised or lowered position.

3. The combination with a vehicle, of a buffer movably mounted on said vehicle, means for transforming said buffer into a scooper, locking mechanism for preventing the transformation of said buffer into a scooper, means for lowering said buffer, and locking mechanism for preventing the lowering of said buffer.

4. The combination with a vehicle, of a support movably mounted on said vehicle, a buffer connected to said support, means for swinging said support, means for locking said support in one position, and means for releasing said locking means.

5. The combination with a vehicle, of a support on said vehicle, arms on said support, arranged at different levels, a buffer connecting said arms, one of said arms being movable relative to said support and comprising a plurality of telescoping members, means for extending the members of said arm, and a spring for extending said last-mentioned arm.

6. The combination with a support, of a plurality of arms connected to said support at different levels, means connected to said arms adapted to form a buffer, one of said arms being extensible relative to said support, a spring for extending said arm, said last-mentioned arm comprising a plurality of telescoping members, and a spring for extending one of said members relative to the other of said members.

7. The combination with a bracket, of a support on said bracket, an arm pivotally connected to said support, an arm slidingly connected to said support, means connecting said arms, adapted to form a buffer, and means for extending said second-mentioned arm.

8. The combination with a bracket, of a support movably connected to said bracket, means for manipulating said support an arm pivotally connected to said support, an arm slidingly connected to said support, means for manipulating said last-mentioned arm, and means connecting said arms adapted to form a buffer.

9. The combination with a plurality of brackets, of a plurality of supports having pin-and-slot connection with said brackets, means for holding said supports in a predetermined position on said brackets, springs for moving said supports relative to said brackets, arms pivotally connected to said brackets, arms slidingly connected to said brackets, spring members connecting said first-mentioned arms with said second-mentioned arms so as to form a buffer, and means for moving said second-mentioned arms relative to said support.

10. The combination with a plurality of brackets, of a plurality of supports having pin-and-slot connection with said brackets, means for holding said supports in a predetermined position on said brackets, springs for moving said supports relative to said brackets, arms pivotally connected to said brackets, arms slidingly connected to said brackets, spring members connecting said first-mentioned arms with said second-mentioned arms so as to form a buffer, means for moving said second-mentioned arms relative to said support, locking mechanism for preventing the movement of said second-mentioned arms relative to said support, and means connected to said first-mentioned arms for releasing said locking mechanism.

11. The combination with a plurality of brackets, of a plurality of supports having pin-and-slot connection with said brackets, means for holding said supports in a predetermined position on said brackets, springs for moving said supports relative to said brackets, arms pivotally connected to said brackets, arms slidingly connected to said brackets, spring members connecting said first-mentioned arms with said second-mentioned arms so as to form a buffer, means for moving said second-mentioned arms relative to said support, locking mechanism for preventing the movement of said second-mentioned arms relative to said support, means connected to said first-mentioned arms for releasing said locking mechanism, and additional locking mechanism independent of said first-mentioned arms for preventing the movement of said second-mentioned arms relative to said support.

12. The combination with a vehicle, of a support on said vehicle, an arm movably connected to said support, an arm adjustably connected to said support, arranged at a different level from said first-mentioned arm, a buffer member connecting said arms, means for extending said second-mentioned arm relative to said support, locking mechanism for preventing the extension of said second-mentioned arm, and means connected to said first-mentioned arm adapted to be operated by the movement of said first-mentioned arm for releasing said locking mechanism.

13. The combination with a vehicle, of a support on said vehicle, an arm movably connected to said support, an arm adjustably connected to said support, arranged at a different level from said first-mentioned arm, a buffer member connecting said arms, means for extending said second-mentioned arm relative to said support, locking mechanism for preventing the extension of said second-mentioned arm, means connected to said first-mentioned arm adapted to be operated by the movement of said first-mentioned arm, for releasing said locking mechanism, and additional locking mechanism for preventing the movement of said second-mentioned arm relative to said support, independent of the movement of said first-mentioned arm.

14. The combination with a vehicle, of a support movably mounted on said vehicle, an arm movably connected to said support, an arm extensibly connected to said support, a plurality of resilient members connecting said arms, so as to form a buffer, locking mechanism for securing said support against movement, means connected to said first-mentioned arm adapted to release said locking mechanism, and locking mechanism independent of the movement of said first-mentioned arm adapted to prevent the movement of said second-mentioned arm relative to said support.

15. The combination with a buffer, of means for transforming said buffer into a scooper, locking mechanism for retaining said buffer in its buffer form, means for releasing said locking mechanism, adapted to be actuated by the impact of an obstacle with said buffer, and a manual control for releasing said locking mechanism.

16. The combination with a buffer, of means for transforming said buffer into a scooper, locking mechanism for retaining said buffer in its buffer form, means for releasing said locking mechanism, adapted to be actuated by the impact of an obstacle with said buffer, a manual control for releasing said locking mechanism, and means connected to said manual control for locking said buffer in its buffer form, independent of said last-mentioned means.

17. The combination with a buffer, of means for transforming said buffer into a scooper, means for locking said buffer in its buffer form, means for releasing said locking means by the impact of an obstacle with said buffer, and additional means for locking said buffer in its buffer form, independent of the impact of an obstacle with said buffer.

18. The combination with a buffer, of means for transforming said buffer into a scooper, means for locking said buffer in its buffer form, means for releasing said locking means by the impact of an obstacle with said buffer, additional means for locking said buffer in its buffer form, independent of the impact of an obstacle with said buffer, and a manual control for both of said locking means.

19. The combination with a buffer, of means for transforming said buffer into a scooper, means for locking said buffer in its buffer form, means for releasing said locking means by the impact of an obstacle with said buffer, additional means for locking said buffer in its buffer form, independent of the impact of an obstacle with said buffer, a manual control for both of said locking means, and additional locking mechanism, independent of said above-mentioned locking means, for securing said buffer in its buffer form.

20. The combination with a vehicle, of a buffer movably mounted on said vehicle, means for moving said buffer bodily, means for transforming said buffer into a scooper, locking mechanism for preventing the bodily movement of said buffer, and means adapted to be actuated by the impact of an obstacle with said buffer, for releasing said locking mechanism.

21. The combination with a vehicle, of a buffer movably mounted on said vehicle, means for moving said buffer bodily, means for transforming said buffer into a scooper, locking mechanism for preventing the bodily movement of said buffer, means adapted to be actuated by the impact of an obstacle with said buffer, for releasing said locking mechanism, and locking mechanism for preventing the transformation of said buffer into a scooper.

22. The combination, with a vehicle, of a buffer movably mounted on said vehicle, means for moving said buffer bodily, means for transforming said buffer into a scooper, locking mechanism for preventing the bodily movement of said buffer, means adapted to be actuated by the impact of an obstacle with said buffer, for releasing said locking mechanism, and means for preventing the release of said locking mechanism, independent of the contact of said buffer with an obstacle.

23. The combination with a vehicle, of a buffer movably mounted on said vehicle, means for moving said buffer bodily, means for transforming said buffer into a scooper, locking mechanism for preventing the bodily movement of said buffer, means adapted to be actuated by the impact of an obstacle with said buffer, for releasing said locking mechanism, independent of the contact of said buffer with an obstacle, and means for manually releasing said locking mechanism.

24. The combination with a buffer, of means for transforming said buffer into a scooper, a flexible connection for returning said buffer to its buffer form, a drum for winding up said flexible connection, means for actuating said drum, means for locking said drum against movement, means for controlling said locking means manually, and additional locking means, independent of said first-mentioned locking means, for securing said drum against movement.

25. The combination with a buffer, of means for transforming said buffer into a scooper, and mechanism for returning said buffer to its buffer form, including a differential member adapted to increase the leverage on said buffer as the resistance increases.

26. The combination with a buffer, of means for transforming said buffer into a scooper, a flexible connection adapted to return said buffer to its buffer form, a differential drum for winding said flexible connection, means for operating said drum, and means for locking said drum against movement.

27. The combination with a fender, of means for extending said fender, a drum for returning said fender to its original position after having once been extended, a locking pawl for preventing the unwinding of said drum, means for releasing said locking pawl from said fender, a lever for winding up said drum, and means for releasing said locking pawl from said lever.

28. The combination with a fender, of means for extending said fender, a drum for returning said fender to its original position after once having been extended, a locking pawl for preventing the unwinding of said drum, means for releasing said locking pawl from said fender, a lever for winding up said drum, means for releasing said locking pawl from said lever, and a pawl on said lever adapted to lock said drum against movement, independent of the movement of said first-mentioned locking pawl.

In testimony whereof we have signed our names to this specification in the presence of two subscribing witnesses.

GEORGE HIPWOOD.
PATRICK EGAN.

Witnesses:
 HORATIO WHITING,
 PHILIP D. ROLLHAUS.

Copies of this patent may be obtained for five cents each, by addressing the "Commissioner of Patents, Washington, D. C."